(12) United States Patent
Opos (10) Patent No.: US 11,386,198 B1
(45) Date of Patent: Jul. 12, 2022

(54) SYSTEMS AND METHODS FOR DETECTING MALICIOUS IN APPLICATION TRANSACTIONS

(71) Applicant: Symantec Corporation, Mountain View, CA (US)

(72) Inventor: Josh Opos, Studio City, CA (US)

(73) Assignee: NortonLifeLock Inc., Tempe, AZ (US)

(\*) Notice: Subject to any disclaimer, the term of this patent is extended or adjusted under 35 U.S.C. 154(b) by 162 days.

(21) Appl. No.: 16/446,836

(22) Filed: Jun. 20, 2019

(51) Int. Cl.
*G06F 21/52* (2013.01)
*G06F 21/55* (2013.01)
*G06Q 20/40* (2012.01)

(52) U.S. Cl.
CPC ............ *G06F 21/52* (2013.01); *G06F 21/554* (2013.01); *G06Q 20/407* (2013.01); *G06Q 20/4016* (2013.01); *G06F 2221/034* (2013.01)

(58) Field of Classification Search
CPC .. G06F 21/52; G06F 21/554; G06F 2221/034; G06Q 20/4016; G06Q 20/407
USPC .......................................................... 726/23
See application file for complete search history.

(56) References Cited

U.S. PATENT DOCUMENTS

| | | | | |
|---|---|---|---|---|
| 2009/0327138 A1\* | 12/2009 | Mardani | ............... | G06Q 20/10 705/64 |
| 2011/0219230 A1\* | 9/2011 | Oberheide | ............. | H04L 9/321 713/168 |
| 2016/0232339 A1\* | 8/2016 | Yang | .................... | G06F 3/1423 |
| 2016/0255505 A1\* | 9/2016 | Oberheide | ........... | H04W 12/06 726/7 |
| 2017/0243183 A1\* | 8/2017 | Soeder | .................. | H04L 63/145 |
| 2019/0158535 A1\* | 5/2019 | Kedem | ............... | H04L 63/1483 |
| 2019/0319987 A1\* | 10/2019 | Levy | .................. | H04L 63/0838 |
| 2020/0143500 A1\* | 5/2020 | DeBeaune | ........... | G06Q 50/265 |
| 2020/0372509 A1\* | 11/2020 | Phalnikar | ............. | G06Q 20/405 |

OTHER PUBLICATIONS

Hall, Zac, "iPhone 'Heart Rate' app on App Store attempts to scam customers out of $90 using Touch ID [U: Removed]", URL: https://9to5mac.com/2018/11/30/app-store-heart-rate-scam/, Nov. 30, 2018, pp. 1-13.
Abrams, Lawrence, "Scam iOS Fitness Apps Steal Money Through AppleTouch ID", URL: https://www.bleepingcomputer.com/news/security/scam-ios-fitness-apps-steal-money-through-apple-touch-id/, Dec. 3, 2018, pp. 1-12.
Apple Support, "Use Screen Time to prevent purchasing on your iPhone, iPad, or iPod touch", URL: https://support.apple.com/en-us/HT204396, retrieved on Sep. 17, 2019, pp. 1-3.

\* cited by examiner

*Primary Examiner* — Benjamin A Kaplan
(74) *Attorney, Agent, or Firm* — FisherBroyles, LLP (57) ABSTRACT

The disclosed computer-implemented method for detecting malicious in-application transactions may include identifying an application running on a computing device, wherein the application is granted access to a payment system, monitoring data between the application and the payment system, determining at least one characteristic associated with the application, determining the at least one characteristic is associated with a malicious transaction on the payment system, and performing at least one action to prevent the malicious transaction. Various other methods, systems, and computer-readable media are also disclosed.

20 Claims, 8 Drawing Sheets

SYSTEMS AND METHODS FOR DETECTING MALICIOUS IN APPLICATION TRANSACTIONS

BACKGROUND

Conventional mobile security products may have the ability to provide options to a user for settings associated with in-application transactions (e.g., purchases) on a computing device (e.g., smartphone). The options settings of conventional mobile security products may be limited to a binary setting of enabling in-application purchases or disabling in-application purchases.

Providers of mobile applications may include malicious code in the application with the intention of misleading users to inadvertently complete a transaction during execution of the application. The transaction may result in the user or account holder being charged for a product and/or service purchase they did not intend to buy. Malicious mobile applications may trick a user into completing a transaction by altering the user interface of the computing device.

Conventional mobile security products may prevent a user from an unintentional transaction by disabling in-application transactions. However, disabling all in-application transactions may also prevent the user from completing legitimate transactions such as intended purchases. The present disclosure, therefore, identifies and addresses a need for systems and methods for detecting malicious in-application transactions.

SUMMARY

As will be described in greater detail below, the present disclosure describes various systems and methods for detecting malicious in-application transactions.

In one example, a method for detecting malicious in-application transactions may include identifying an application running on a computing device, wherein the application is granted access to a payment system. The method may further include monitoring data between the application and the payment system. The method may further include determining at least one characteristic associated with the application, determining the at least one characteristic is associated with a malicious transaction on the payment system, and providing at least one action to prevent the malicious transaction.

In some examples, monitoring the data between the application and the payment system may comprise monitoring data packets transmitted from the computing device over a virtual private network.

In some examples, the at least one action may comprise blocking the malicious transaction associated with the application.

In some examples, blocking the malicious transaction may comprise deleting data packets transmitted between the application and the payment system.

In some examples, the at least one action may comprise delaying, on the computing device, the malicious transaction for a predetermined time period.

In some examples, the at least one action comprises executing a two factor authentication procedure.

In some examples, the at least one action may comprise approving, by an authority figure of a user of the computing device, the malicious transaction associated with the application.

In some examples, the method may further include placing the application on a blacklist, wherein the at least one characteristic comprises the application being on the blacklist.

In some examples, the at least one characteristic associated with the application may comprise the application dimming a screen of the computing device.

In some examples, the method may further include determining a signature associated with the application, wherein the at least one characteristic comprises the signature associated with the application.

In one embodiment, a system for detecting malicious in-application transactions may include at least one physical processor and physical memory that includes computer-executable instructions that, when executed by the physical processor, cause the physical processor to identify an application running on a computing device, wherein the application is granted access to a payment system. The instructions may further cause the physical processor to monitor data between the application and the payment system. The instructions may further cause the physical processor to determine at least one characteristic associated with the application, determine the at least one characteristic is associated with a malicious transaction on the payment system, and perform at least one action to prevent the malicious transaction.

In some examples, the data between the application and the payment system may comprise monitoring data packets transmitted from the computing device over a virtual private network.

In some examples, the at least one action may comprise blocking the malicious transaction associated with the application.

In some examples, blocking the malicious transaction may comprise deleting data packets transmitted between the application and the payment system.

In some examples, the at least one action may comprise delaying, on the computing device, the malicious transaction for a predetermined time period.

In some examples, the at least one action may comprise executing a two factor authentication procedure.

In some examples, the at least one action may comprise approving, by an authority figure of a user of the computing device, the malicious transaction associated with the application.

In some examples, the instructions may further cause the physical processor to place the application on a blacklist, wherein the at least one characteristic comprises the application being on the blacklist.

In some examples, the at least one characteristic associated with the application may comprise the application dimming a screen of the computing device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to identify an application running on a computing device, wherein the application is granted access to a payment system. The computer-executable instructions when executed by the at least one processor of the computing device may monitor data between the application and the payment system. The computer-executable instructions when executed by at least one processor of a computing device may determine at least one characteristic associated with the application, determine the at least one characteristic is associated with a malicious transaction on the payment system, and perform at least one action to prevent the malicious transaction.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting malicious in-application transactions. As will be explained in greater detail below, by monitoring data between an application and a payment system, the systems and methods described herein may be able to determine at least one characteristic associated with the application, determine the at least one characteristic is associated with a malicious transaction on the payment system, and perform at least one action to prevent the malicious transaction.

By performing an action to prevent the malicious transaction of the application in this way, the systems and methods described herein may be able to improve the operation of the computing device. In particular, the systems and methods described herein may improve the security of user payment accounts by informing the user of a malicious transaction and taking actions to prevent the transaction. The systems and methods described herein may also improve the detection of vendors that provide applications that execute malicious transactions. Further, the systems and methods described herein may improve the experience of a user operating the computing device by informing the user of malicious transactions.

Figure 1:
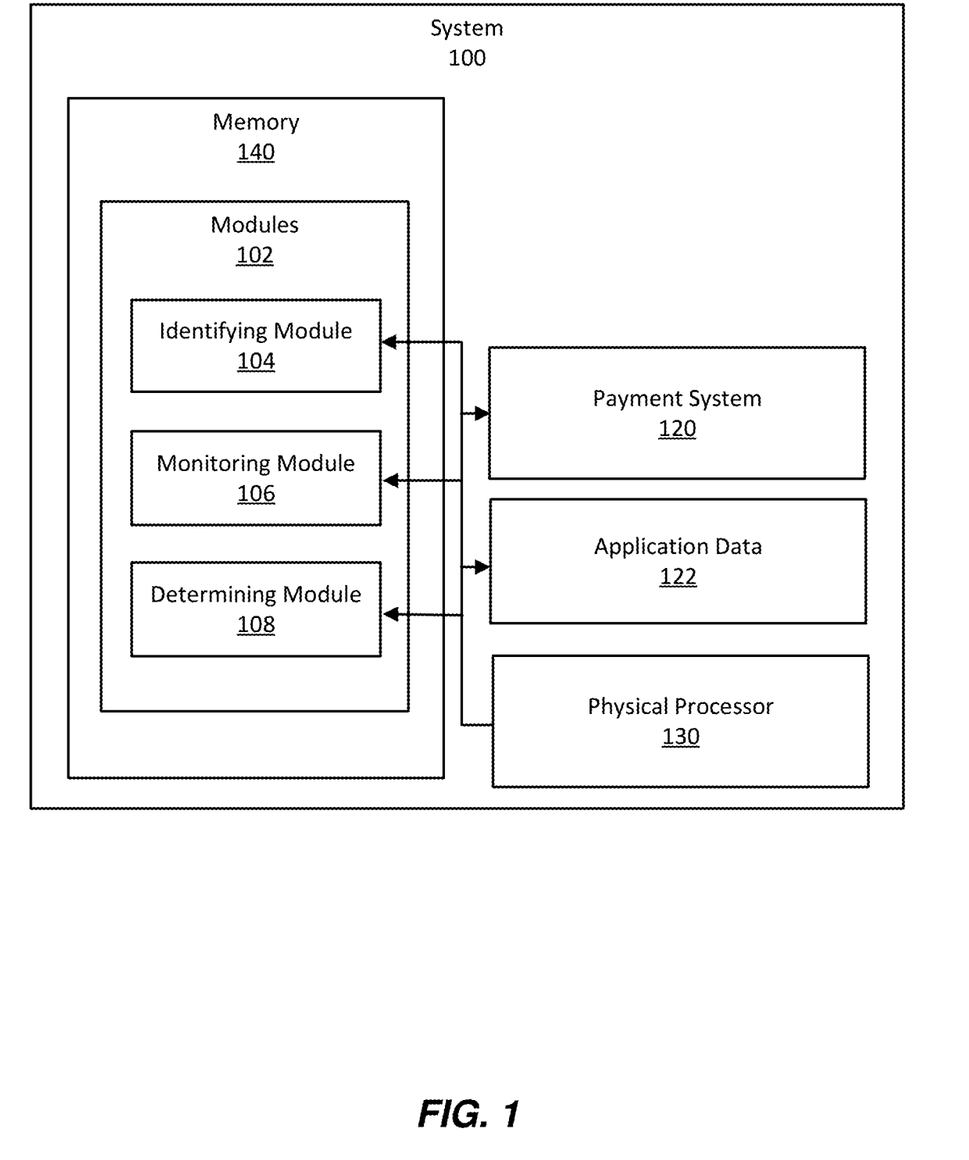
FIG. 1 is a block diagram of an example system for detecting malicious in-application transactions.
Figure 2:
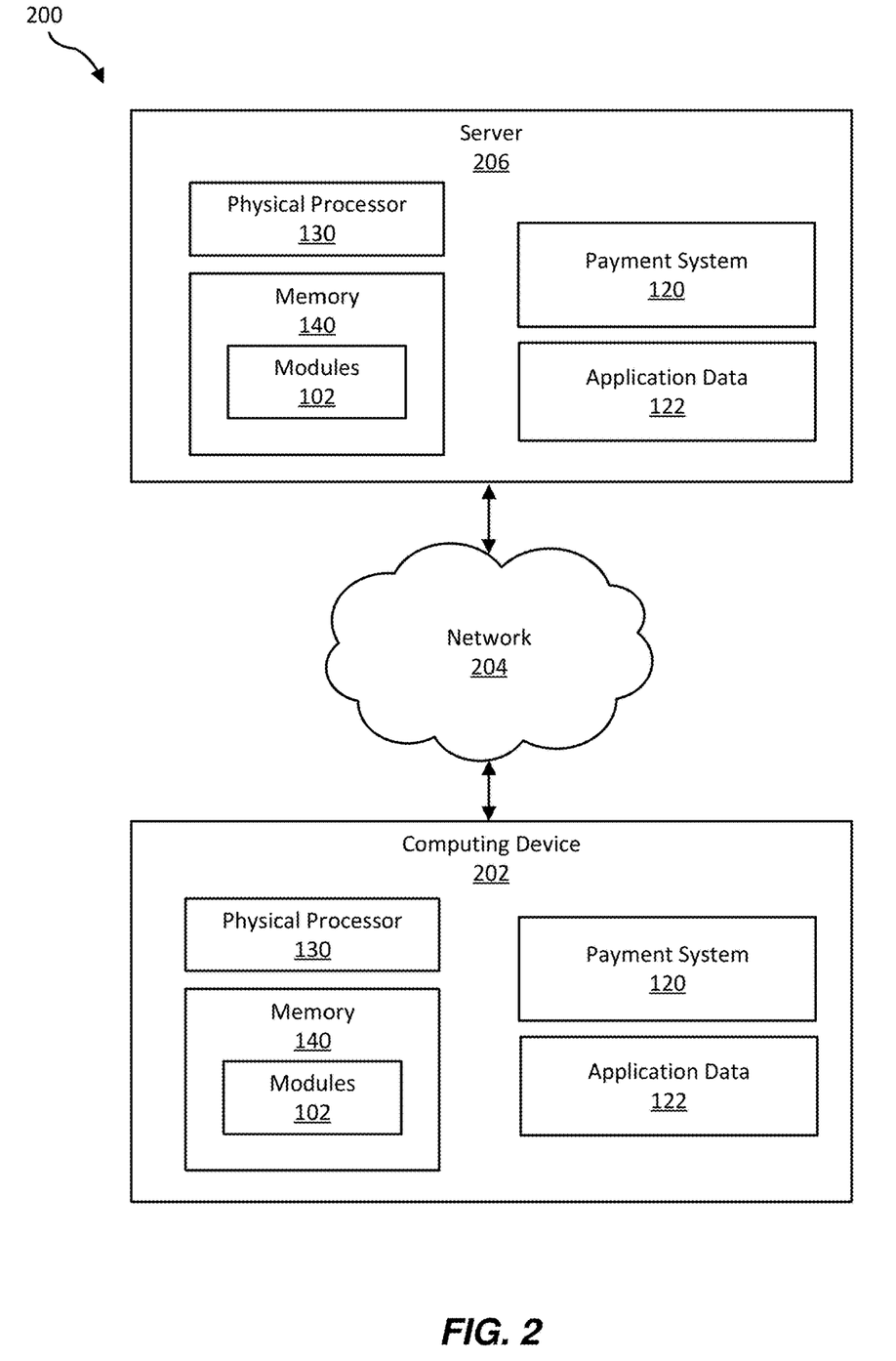
FIG. 2 is a block diagram of an additional example system for detecting malicious in-application transactions.

The following will provide, with reference to FIGS. 1-2, detailed descriptions of example systems for detecting malicious in-application transactions. Detailed descriptions of corresponding computer-implemented methods for detecting malicious transactions will be provided in connection with FIG. 3. Detailed descriptions of corresponding computer-implemented methods for monitoring data between the application and a payment will be provided in connection with FIG. 4. Detailed descriptions of example application screens associated with a malicious application will be provided in connection with FIGS. 5 and 6. In addition, detailed descriptions of an example computing system and network architecture capable of implementing one or more of the embodiments described herein will be provided in connection with FIGS. 7 and 8, respectively.

FIG. 1 is a block diagram of an example system 100 for detecting malicious in-application transactions. As illustrated in this figure, example system 100 may include one or more modules 102 for performing one or more tasks. As will be explained in greater detail below, modules 102 may include an identifying module 104, a monitoring module 106, and a determining module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malicious in-application transactions. Examples of physical processor 130 include, without limitation, microprocessors, microcontrollers, Central Processing Units (CPUs), Field-Programmable Gate Arrays (FP- GAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more data storage elements, such as characteristic data 122. Characteristic data 122 generally represents any type or form of memory storage that stores data associated with the characteristics of the application(s). In one example, characteristic data 122 may store data associated with the application(s) (e.g., actions taken by the application) that is generated by an analysis of the application. Examples of characteristic data 122 include, without limitation, dimming of a computing device screen, accessing payment system 120, displaying a purchase transaction, requesting a fingerprint, or a combination thereof. Example system 100 may also include payment system 120. Payment system 120 may enable a user of the computing device to make a payment for a product and/or service through an application running on the computing device.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detecting malicious in-application transactions. For example, and as will be described in greater detail below, one or more of modules 102 may cause computing device 202 and/or server 206 to identify an application running on computing device 202 that has been granted access to payment system 120. One or more of modules 102 may cause computing device 202 and/or server 206 to monitor data between the application and payment system 120, determine at least one characteristic associated with the application, store the characteristic in characteristic data 122, determine the at least one characteristic is associated with a malicious transaction on payment system 120, and perform at least one action to prevent the malicious transaction.

Computing device 202 generally represents any type or form of computing device capable of reading computer-executable instructions. Computing device 202 may be a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of determining characteristics of an application, collecting application installation data from multiple users, and presenting the characteristics of the application and the collected application installation data to a computing device. Additional examples of server 206 include, without limitation, VPN servers, payment servers, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, a Virtual Private Network (e.g., VPN), an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
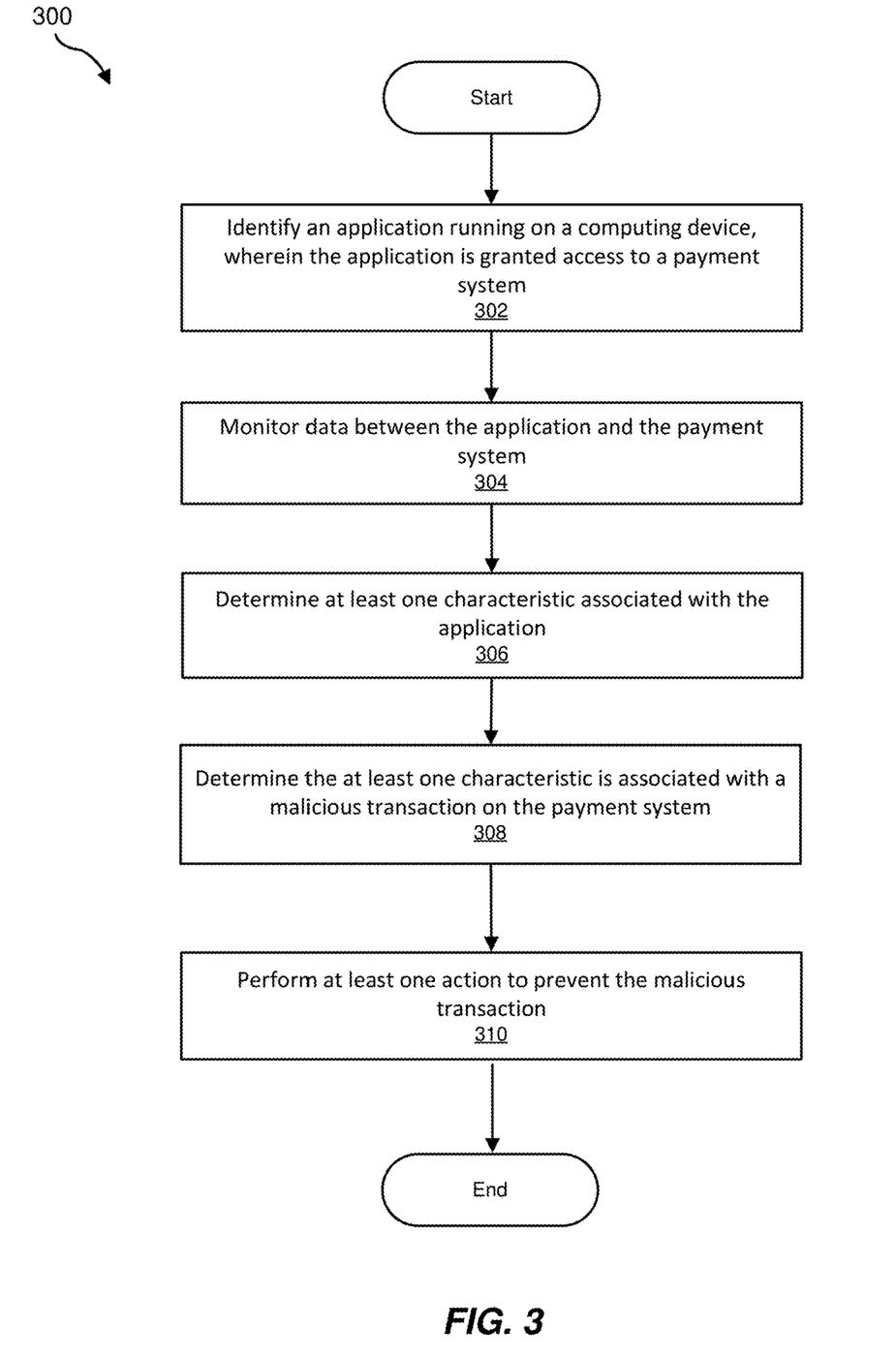
FIG. 3 is a flow diagram of an example method for detecting malicious in-application transactions.

FIG. 3 is a flow diagram of an example computer-implemented method 300 for detecting malicious in-application transactions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify an application running on computing device 202 that is granted access to payment system 120. For example, identifying module 104 may, as part of server 206 and/or computing device 202 in FIG. 2, identify an application running on computing device 202 that is granted access to payment system 120. Identifying module 104 in computing device 202 may identify an application running on computing device 202 that is granted access to payment system 120 by monitoring API calls from the application code to payment system 120. For example, if computing device 202 is running iOS, identifying module 202 may look for API calls including, without limitation, SKPaymentQueue, SKPaymentQueueDelegate, SKPaymentTransaction Observer, or a combination thereof. As another example, if computing device 202 is running Android OS, identifying module 202 may look for API calls including, without limitation, GetPurchases, GetSKUDetails, GetBuytIntent, or a combination thereof.

At step 304, one or more of the systems described herein may monitor data between the application and the payment system. Monitoring module 106 may, as part of server 206 and/or computing device 202 in FIG. 2, monitor data communicated between the application and payment system 120. Monitoring module 104 in computing device 202 and/or server 206 may monitor data communicated between the application and payment system 120 by tunneling data in network 204 through a Virtual Private Network (e.g., VPN). As will be described in detail below with respect to FIG. 4, data tunneled through VPN Tunnel 406 may be monitored (e.g., parsed) by VPN Server 408.

At step 306, one or more of the systems described herein may determine at least one characteristic associated with the application. Determining module 104 in computing device 202 and/or server 206 may determine characteristics of the application running on computing device 202. In some examples, the characteristics of the application running on computing device 202 may be used to determine whether the application is attempting to perform a malicious transaction. For example, determining module 104 may determine that the application has dimmed the screen of computing device 202 and displayed a message to confirm a transaction (e.g., in-application purchase). The application may dim the screen of computing device 202 while displaying the transaction confirmation message so that the user may be unable to read the transaction confirmation message and may unintentionally confirm the transaction, thereby providing the application vendor with a payment.

At step 308, one or more of the systems described herein may determine the at least one characteristic is associated with a malicious transaction on the payment system. For example, determining module 108 may determine whether the application is attempting to perform a malicious transaction. For example, determining module 108 may determine that the application has displayed a message to confirm a transaction (e.g., in-application purchase) and has displayed a message requesting the user to scan the user's fingerprint. Determining module 108 may determine that the message to scan the user's fingerprint is for purposes other than transaction confirmation (e.g., place finger here for heart rate measurement). However, determining module 108 may determine that the application presents the fingerprint scan message under false pretenses and actually uses the fingerprint to confirm the transaction.

At step 310, one or more of the systems described herein may perform at least one action to prevent the malicious transaction. For example, server 206 and/or computing device 202 may perform at least one action to prevent the malicious transaction. The action to prevent the malicious transaction may include messaging, intervening a payment transaction, modifying a user interface on computing device 202, or a combination thereof. For example, computing device 202 may delay execution of the transaction and present a message to the user of the application asking the user to confirm/re-confirm the payment transaction. The transaction may be delayed by a set amount of time (e.g., set number of seconds) while the confirm/re-confirm message is displayed. As another example, server 206 and/or computing device 202 may require an additional authentication step be performed before executing the transaction. Server 206 and/or computing device 202 may require a multiple factor (e.g., two factor) authentication step be performed before executing the transaction. After confirming the transaction, the user may be required to enter a code (e.g., PIN code) sent to computing device 202 via short message service. As another example, server 206 and/or computing device 202 may require an additional authentication step be performed by an authority figure of the user before executing the transaction. After the user confirms the transaction, an authorization message may be sent to an authority figure of the user (e.g., parent, account owner) requesting the authority figure confirm or cancel the transaction. Server 206 and/or computing device 202 may cancel or confirm the transaction based on the action taken by the authority figure in response to the authorization message. As another example, server 206 and/or computing device 202 may block (e.g., cancel) a transaction initiated by applications designated on a blacklist. Server 206 and/or computing device 202 may maintain a blacklist of applications known to execute malicious transactions. Further, server 206 and/or computing device 202 may add applications to the blacklist when it is determined that the application has executed malicious transactions. As another example, computing device 202 may block (e.g., cancel) a transaction initiated by applications that dim the display screen of computing device 202 during a transaction confirmation. Malicious applications may dim the display screen during transaction confirmation in order to mislead the user into confirming the malicious transaction. As another example, server 206 and/or computing device 202 may block (e.g., cancel) a transaction initiated by applications having a malicious signature. The application may have identifying characteristics that may be used to create a unique signature associated with the application. The application may have identifying characteristics that identify the application as having a malicious signature. For example, the application may have a combination of the above identified characteristics (e.g., screen dimming, known malicious code segments, false fingerprint scan) that determine the application to be malicious.

Figure 4:
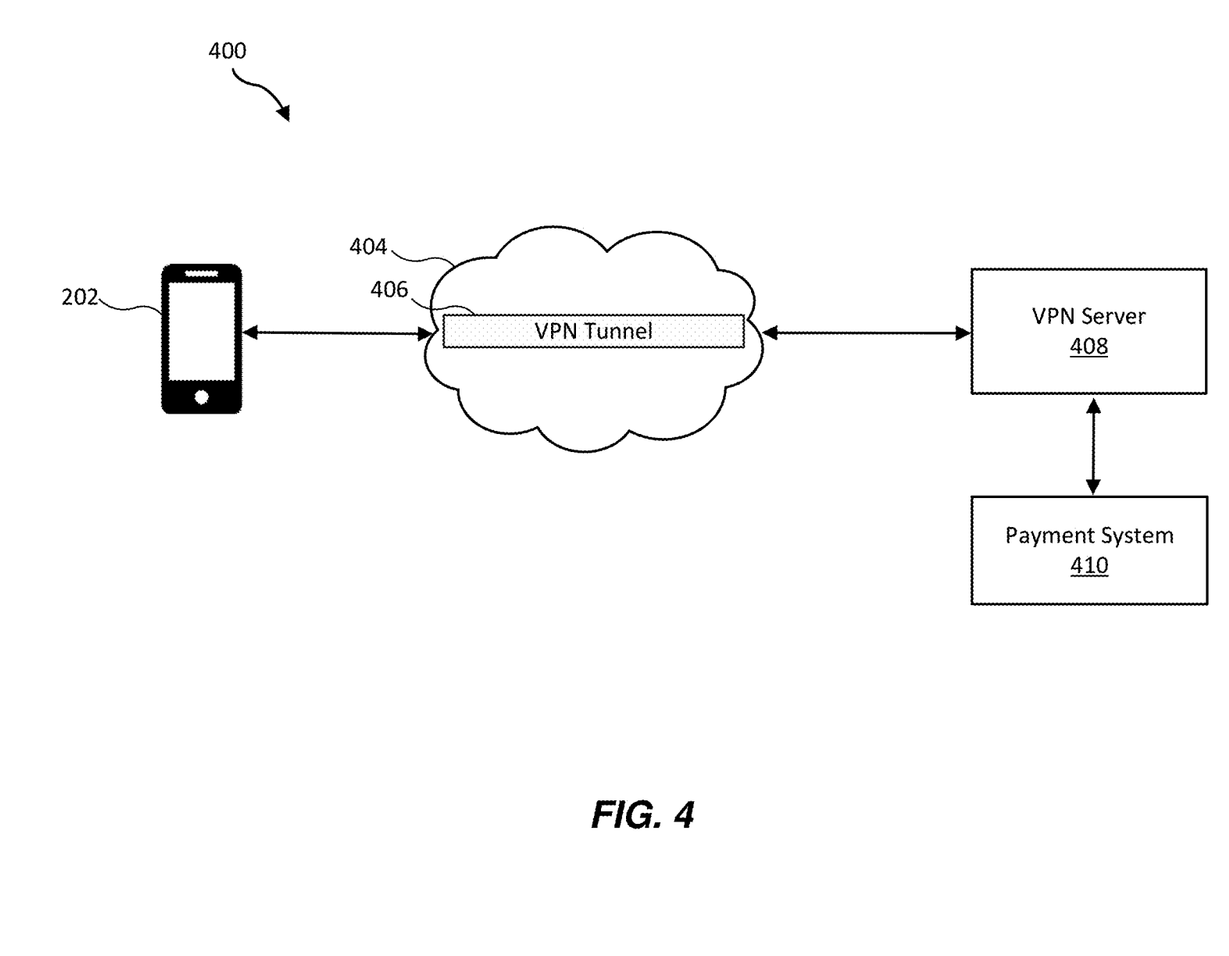
FIG. 4 is a block diagram of a virtual private network for detecting malicious in-application transactions.

FIG. 4 is a block diagram of a virtual private network for detecting malicious in-application transactions. In some examples, a virtual private network (VPN) may be used to monitor data transferred between an application and a payment system. The monitored data may be analyzed (e.g., parsed) to determine whether the data transferred between the application and the payment system is associated with a malicious transaction. Further, when a malicious transaction is detected, the VPN may block the malicious transaction by deleting data packets associated with execution of the transaction. Referring to FIG. 4, computing device 202 may be connected to VPN server 408 through VPN tunnel 406. VPN tunnel 406 may transfer data packets between computing device 202 and VPN server 408 using network 404 (e.g., the Internet). VPN tunnel 406 may use an encrypted layered tunneling protocol to securely transfer data packets between computing device 202 and VPN server 408. In some examples, VPN server 408 may be connected to payment system 410. Payment system 410 (e.g., iOS In-App Purchase Framework, Google Play billing) may execute payments generated by in-application transactions running on computing device 202. In some examples, when an application running on computing device 202 is determined to be attempting to execute a malicious transaction on payment system 410, VPN server 408 may determine the data packets transmitted through VPN tunnel 408 that are associated with the transaction and delete the data packets, thereby blocking the malicious transaction from executing.

Figure 5:
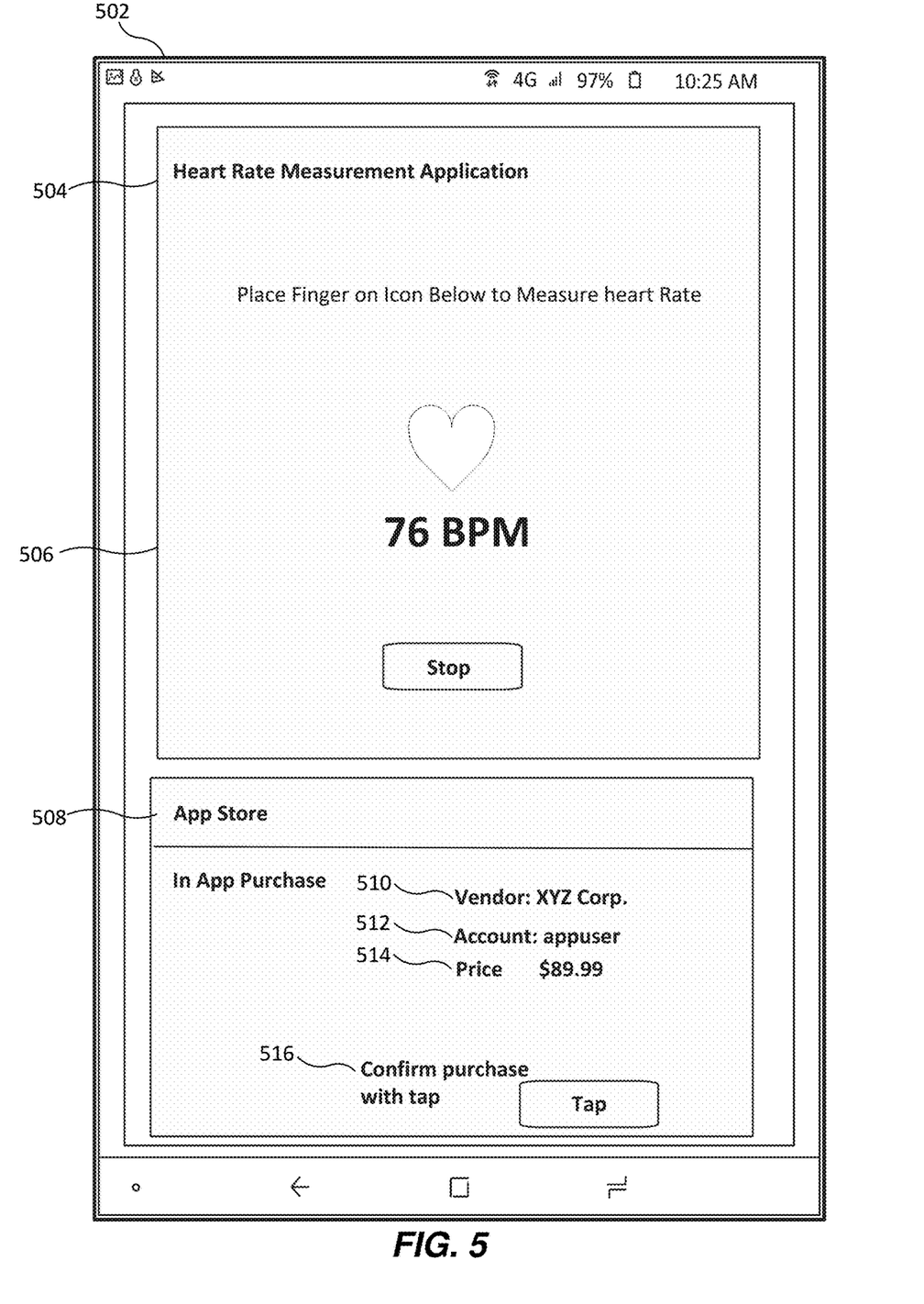
FIG. 5 is a screen display of an application showing an in-application transaction attempt.

FIG. 5 is a screen display of an application showing an in-application transaction attempt. Referring to FIG. 5, screen 502 may display screen content associated with an application. For example, screen 502 may display content associated with heart rate measurement application 504 in window 506. Heart rate measurement application 504 may measure the heart rate of the application user and display the measured heart rate in window 506. Screen 502 may also display content associated with app store 508. App store 508 may be used to execute transactions (e.g., purchases) while running the heart rate measurement application 504. For example, screen 502 may display vendor 510 that is charging the user with the in-application transaction and will receive payment upon completion of the transaction. Account 512 identifies the account holder that will be charged for the transaction when executed. Price 514 is the amount charged to account holder 512 and paid to vendor 510 upon completion of the transaction. Confirmation 516 is an icon tapped by the user of computing device 202 in order to confirm and execute the transaction.

Figure 6:
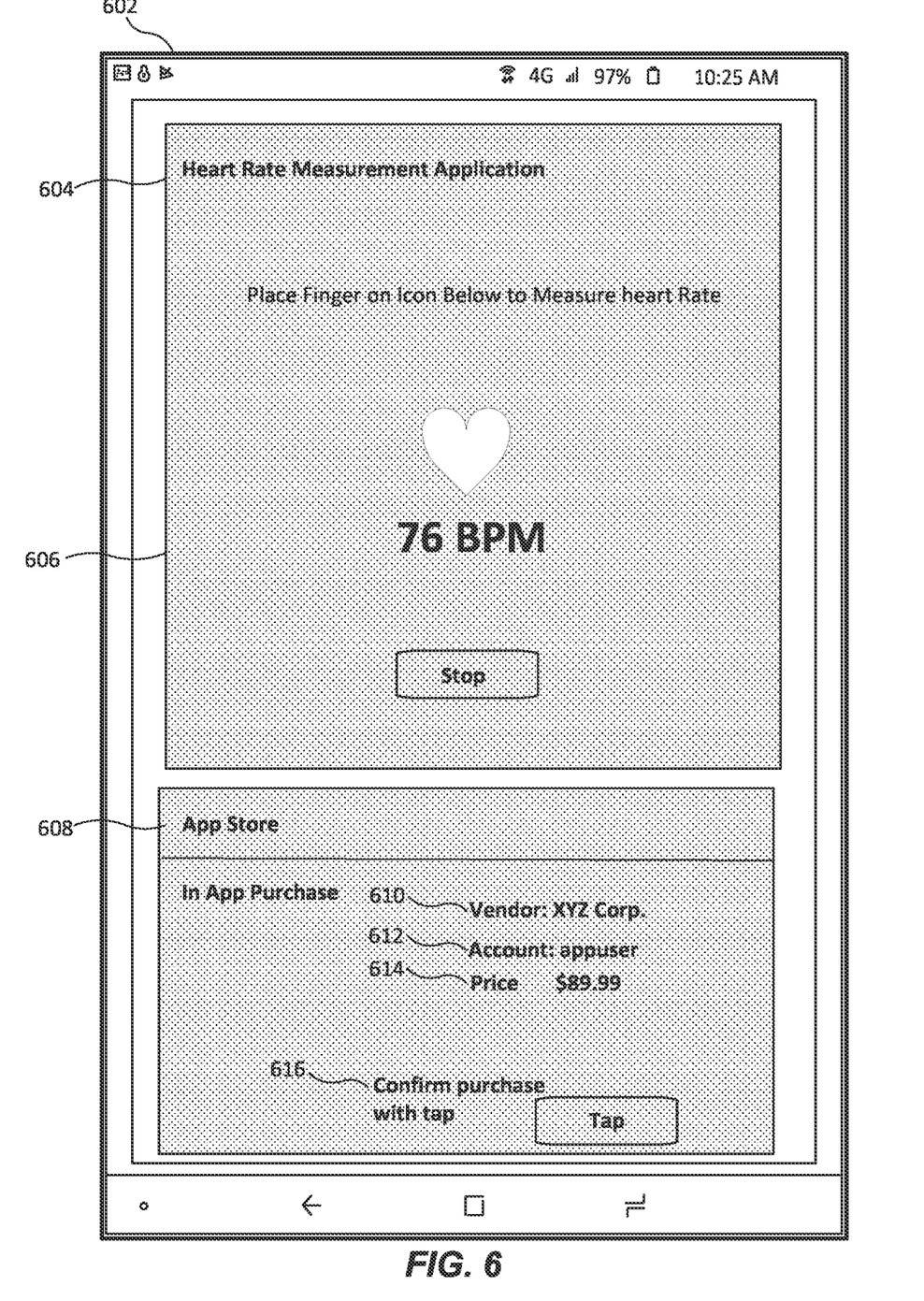
FIG. 6 is a screen display of an application showing a dimmed screen during an in-application transaction attempt.

FIG. 6 is a screen display of an application showing a dimmed screen during an in-application transaction attempt. FIG. 6 shows the identical content displayed in FIG. 5 with screen 602 lighting dimmed such that the user is unable or has difficulty reading the displayed content. Referring to FIG. 6, screen 602 may display screen content associated with heart rate measurement application 604 in window 606. Heart rate measurement application 604 may measure the heart rate of the application user and display the measured heart rate in window 606. Screen 602 may also display content associated with app store 608. App store 608 may be used to execute transactions (e.g., purchases) while running the heart rate measurement application 604. For example, screen 602 may display vendor 610 that is charging the user with the in-app transaction and will receive payment upon completion of the transaction. Account 612 identifies the account holder that will be charged for the transaction when executed. Price 614 is the amount charged to account holder 612 and paid to vendor 610 upon completion of the transaction. Confirmation 616 is an icon tapped by the user of computing device 202 in order to confirm and execute the transaction. FIG. 6 shows heart rate measurement application 604 dimming the screen while displaying the in-application transaction in order to hide the transaction details and mislead the user into executing the transaction. Determining module 108 may determine that dimming the screen during an in-application transaction is a characteristic associated with a malicious transaction. In response to determining the transaction to be malicious based on the characteristics of the application, computing device 202 and/or server 206 may delay execution of the transaction by a set period of time, require a multifactor authentication of the transaction, require authorization by an authority figure of the user, block (e.g., cancel) the transaction, or a combination thereof.

Figure 7:
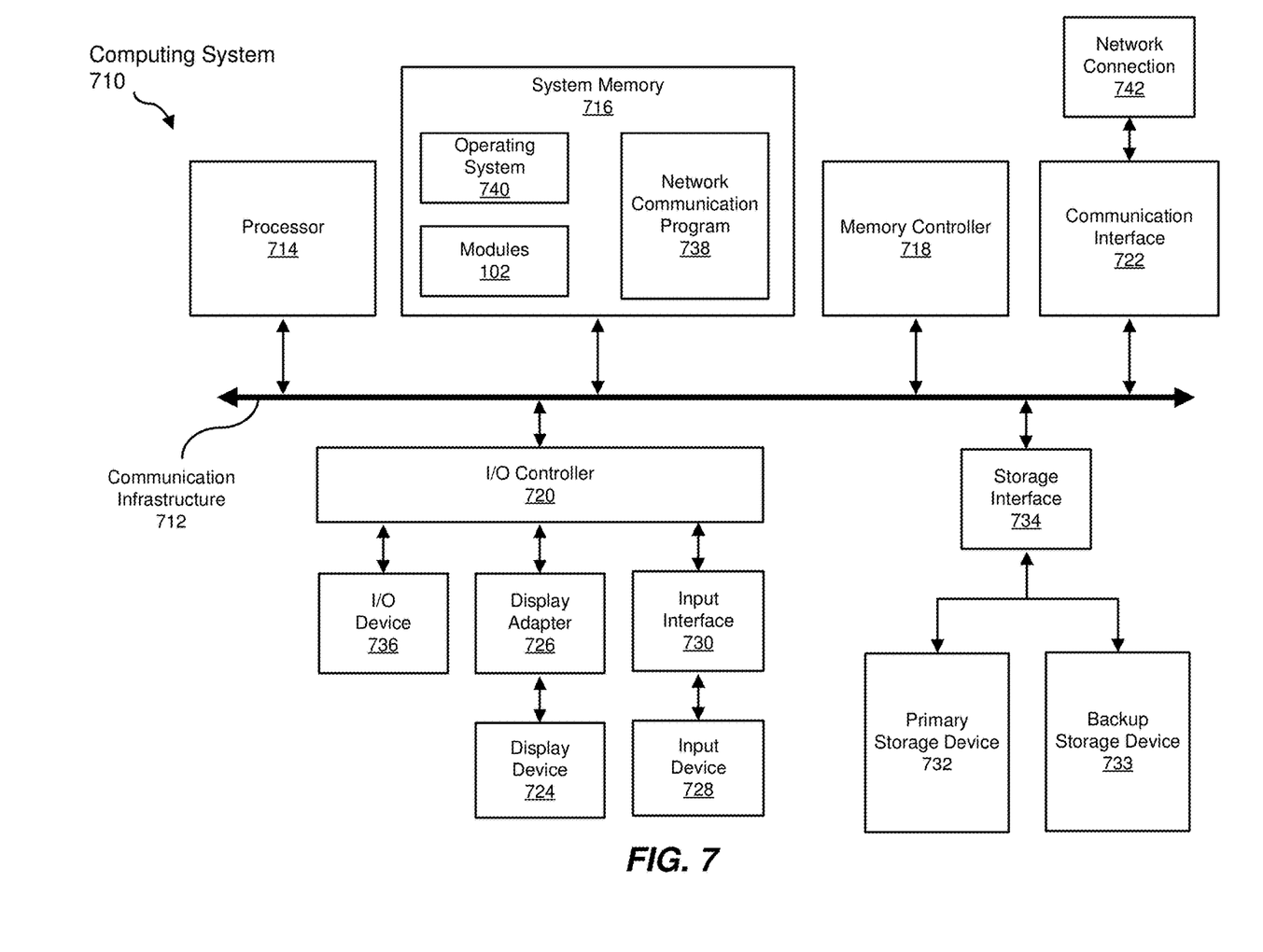
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 1OS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, installation data 120 and characteristic data 122 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
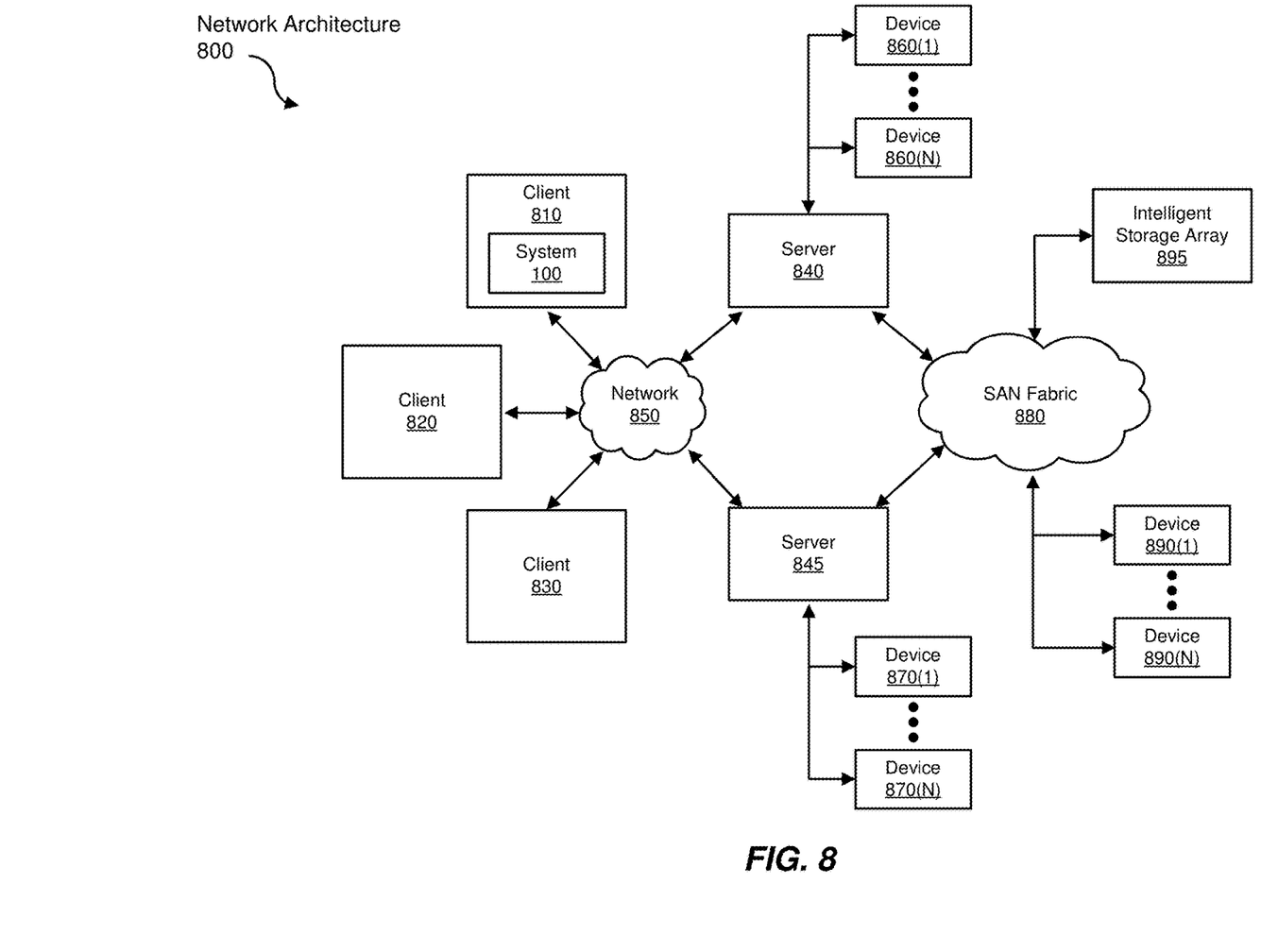
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for detecting malicious in-application transactions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive characteristic data 122 to be transformed, transform the characteristic data 122 and output a result of the transformation to computing device 202. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious in-application transactions, at least a portion of the method being performed by a computing device comprising at least one processor, the method comprising:
   identifying an application running on the computing device, wherein the application is granted access to a payment system for performing in-application transactions;
   monitoring data between the application and the payment system;
   identifying at least one characteristic of the application that is associated with confirming an in-application transaction;
   determining, based on the at least one characteristic, that the application is attempting to trick a user of the computing device into confirming a malicious in-application transaction on the payment system by dimming a screen of the computer device; and
   performing at least one action to prevent the malicious in-application transaction.

2. The computer-implemented method of claim 1, wherein monitoring the data between the application and the payment system comprises monitoring data packets transmitted from the computing device over a virtual private network.

3. The computer-implemented method of claim 1, wherein the at least one action comprises blocking the malicious in-application transaction.

4. The computer-implemented method of claim 3, wherein blocking the malicious in-application transaction comprises deleting data packets transmitted between the application and the payment system.

5. The computer-implemented method of claim 1, wherein the at least one action comprises delaying, on the computing device, the malicious in-application transaction for a predetermined time period.

6. The computer-implemented method of claim 1, wherein the at least one action comprises executing a two factor authentication procedure.

7. The computer-implemented method of claim 1, wherein the at least one action comprises sending an authorization message about the malicious in-application transaction to an authority figure of the user of the computing device.

8. The computer-implemented method of claim 1, further comprising placing the application on a blacklist based on determining that the application has executed a malicious transaction.

9. The computer-implemented method of claim 1, wherein the at least one characteristic of the application that is associated with confirming the in-application transaction comprises a signature associated with the application.

10. A system for detecting malicious in-application transactions, the system comprising:
    at least one physical processor; and
    physical memory comprising computer-executable instructions that, when executed by the physical processor, cause the physical processor to:
       identify an application running on a computing device, wherein the application is granted access to a payment system for performing in-application transactions;
       monitor data between the application and the payment system;
       identify at least one characteristic of the application that is associated with confirming an in-application transaction;
       determine, based on the at least one characteristic, that the application is attempting to trick a user of the computing device into confirming a malicious in-application transaction on the payment system by dimming a screen of the computing device; and
       performing at least one action to prevent the malicious in-application transaction.

11. The system of claim 10, wherein monitoring the data between the application and the payment system comprises monitoring data packets transmitted from the computing device over a virtual private network.

12. The system of claim 10, wherein the at least one action comprises blocking the malicious in-application transaction.

13. The system of claim 12, wherein blocking the malicious in-application transaction comprises deleting data packets transmitted between the application and the payment system.

14. The system of claim 10, wherein the at least one action comprises delaying, on the computing device, the malicious in-application transaction for a predetermined time period.

15. The system of claim 10, wherein the at least one action comprises executing a two factor authentication procedure.

16. The system of claim 10, wherein the at least one action comprises sending an authorization message about the malicious in-application transaction to an authority figure of the user of the computing device.

17. The system of claim 10, further comprising placing the application on a blacklist based on determining that the application has executed a malicious transaction.

18. A non-transitory computer-readable medium comprising one or more computer-executable instructions that, when executed by at least one processor of a computing device, cause the computing device to:
    identify an application running on the computing device, wherein the application is granted access to a payment system for performing in-application transactions;
    monitor data between the application and the payment system;
    identify at least one characteristic of the application that is associated with confirming an in-application transaction;
    determine, based on the at least one characteristic that the application is attempting to trick a user of the computing device into confirming with a malicious in-application transaction on the payment system by dimming a screen of the computing device; and
    performing at least one action to prevent the malicious in-application transaction.

19. The non-transitory computer-readable medium of claim 18, wherein monitoring the data between the application and the payment system comprises monitoring data packets transmitted from the computing device over a virtual private network.

20. The non-transitory computer-readable medium of claim 18, wherein the at least one action comprises blocking the malicious in-application transaction.

* * * * *